United States Patent
Kim et al.

(10) Patent No.: US 9,164,310 B2
(45) Date of Patent: Oct. 20, 2015

(54) LIQUID CRYSTAL DISPLAY DEVICE AND DRIVING METHOD THEREOF

(75) Inventors: YoungHoon Kim, Goyang-si (KR); JoongMin Yoon, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 571 days.

(21) Appl. No.: 13/339,157

(22) Filed: Dec. 28, 2011

(65) Prior Publication Data
US 2012/0206512 A1 Aug. 16, 2012

(30) Foreign Application Priority Data
Feb. 14, 2011 (KR) .................. 10-2011-0012985

(51) Int. Cl.
*G09G 5/10* (2006.01)
*G09G 3/36* (2006.01)
*G02F 1/1335* (2006.01)

(52) U.S. Cl.
CPC ...... *G02F 1/133514* (2013.01); *G02F 2201/52* (2013.01); *G09G 2300/0452* (2013.01)

(58) Field of Classification Search
None
See application file for complete search history.

(56) References Cited

U.S. PATENT DOCUMENTS

| | | | | |
|---|---|---|---|---|
| 2003/0193625 A1* | 10/2003 | Yoshida et al. | .................. | 349/43 |
| 2004/0234163 A1* | 11/2004 | Lee et al. | ...................... | 382/298 |
| 2005/0128224 A1* | 6/2005 | Baek et al. | .................... | 345/690 |
| 2009/0051638 A1 | 2/2009 | Horiuchi et al. | | |
| 2009/0161241 A1 | 6/2009 | Wang et al. | | |
| 2009/0322802 A1 | 12/2009 | Noguchi et al. | | |

FOREIGN PATENT DOCUMENTS

| | | | |
|---|---|---|---|
| CN | 101178508 A | 5/2008 | |
| CN | 101336443 A | 12/2008 | |

OTHER PUBLICATIONS

Office Action issued in Chinese Patent Application No. 201110438681.6, mailed Sep. 28, 2014, 18 pages.

* cited by examiner

*Primary Examiner* — Christopher R Lamb
(74) *Attorney, Agent, or Firm* — Brinks Gilson & Lione

(57) ABSTRACT

Disclosed are an LCD device and a driving method thereof, which save the manufacturing cost that is expended by the application of four-color (RGBW) sub-pixels, and enhance an aperture ratio and brightness, thus increasing display quality. The LCD device includes an upper substrate, a lower substrate, and a liquid crystal layer. A plurality of R, G, B and W color filters are formed at the upper substrate. In the lower substrate, a plurality of R, G, B and W sub-pixels are formed in respective regions defined by intersection of a plurality of gate lines and data lines. The liquid crystal layer is formed between the upper substrate and the lower substrate. Each of the pixels is configure with three-color sub-pixels of the R, G, B and W sub-pixels. Pixels of the plurality of pixels including a W sub-pixel share a one-color sub-pixel included in a pixel adjacent thereto, and display a color image.

15 Claims, 7 Drawing Sheets

LIQUID CRYSTAL DISPLAY DEVICE AND DRIVING METHOD THEREOF

This application claims the priority and the benefit under 35 U.S.C. §119(a) on Korean Patent Application No. 10-2011-0012985 filed on Feb. 14, 2011, the entire contents of which are hereby incorporated by reference.

BACKGROUND

1. Field of the Invention

The present disclosure relates to a Liquid Crystal Display (LCD) device, and more particularly, an LCD device and a driving method thereof, which save the manufacturing cost that is expended by the application of four-color (RGBW) sub-pixels, and enhance an aperture ratio and brightness, thus increasing display quality.

2. Discussion of the Related Art

In LCD devices, manufacturing technology has been advanced, drivability of a driving means is good, low power is consumed, high quality is realized, and a large screen is realized. Therefore, LCD devices are being popularized, and application fields for LCD devices are continuously expanding.

FIG. 1 is a diagram illustrating a pixel structure, which includes RGB sub-pixels of a related art LCD device. FIG. 1 illustrates one unit pixel 10 of a plurality of pixels that are formed in a matrix type, in a liquid crystal panel. Hereinafter, the unit pixel is referred to as a pixel.

Referring to FIG. 1, in a related art LCD device, the one pixel 10 is configured with three-color sub-pixels, namely, a red (R) sub-pixel 12, a green (G) sub-pixel 14 and a blue (B) sub-pixel 16. The LCD device adjusts the transmittance of light, irradiated from a backlight unit onto each sub-pixel, to display a color image.

In the related art LCD device, light emitted from a light source of the backlight unit is transmitted through RGB color filters that are formed at an upper substrate, whereby brightness is degraded. The degradation of brightness is a main cause that degrades the display quality of an image.

FIG. 2 is a diagram illustrating a pixel structure, which includes RGBW sub-pixels of a related art LCD device. FIG. 3 is a diagram illustrating an RGBW quad pixel structure of a related art LCD device.

Referring to FIG. 2, a pixel structure 20 including RGBW sub-pixels further includes a white (W) sub-pixel 28, in addition to the R sub-pixel 22, G sub-pixel 24 and B sub-pixel 26. The pixel structure 20 has been proposed for solving the limitation of the pixel structure of FIG. 1 where brightness is degraded.

Furthermore, as illustrated in FIG. 3, a quad pixel structure 30 which includes RGBW sub-pixels has been proposed, and further includes a W sub-pixel 30, in addition to the existing R sub-pixel 32, G sub-pixel 34 and B sub-pixel 36. In the quad pixel structure 30, the four-color sub-pixels 32, 34, 36 and 38 are arranged in a quad structure.

In the related art LCD device having the pixel structure 20 of FIG. 2 or the quad pixel structure 30 of FIG. 3, the W sub-pixel 28 or 38 increases brightness of light emitted from each pixel.

The brightness has been increased by applying the pixel structure 20 or the quad pixel structure 30. However, the purity of RGB colors becomes lower, causing pure color darkness.

Moreover, a Thin Film Transistor (TFT) is formed in each of four sub-pixels R, G, B and W, and consequently, an aperture ratio of each pixel is reduced.

In the pixel structure 20 of FIG. 2, a data line is additionally formed for supplying image data (data voltage) to the additionally disposed W sub-pixel, causing the reduction in an aperture ratio. Also, as the number of data lines increases, the number of source drive ICs (D-ICs) increases, and thus, the manufacturing cost increases.

In the quad pixel structure 30 of FIG. 3, a gate line is additionally formed compared to the existing stripe pixel structure, causing the reduction in an aperture ratio. Also, the number of gate drive ICs (G-ICs) increases in proportion to the increased number of gate lines, and thus, the manufacturing cost increases.

In regard to a manufacturing process, in the pixel structure 20 of FIG. 2, a TFT mask design structure for the existing three-color (RGB) pixel structure is applied to a process of manufacturing a lower substrate as-is.

However, a process of manufacturing an upper substrate additionally requires a mask for forming the W sub-pixel. Due to this reason, a manufacturing process design is changed, and thus, the manufacturing cost increases.

FIG. 4 is a diagram illustrating image data (data voltages) applied to a pixel structure which includes RGBW sub-pixels of a related art LCD device.

Referring to FIG. 4, when image data (data voltages) are respectively supplied to RGBW sub-pixels by 1-dot inversion scheme, image data having the same polarity are respectively supplied to sub-pixels of the same color that are disposed on one horizontal line. Due to this reason, sub-pixels are deteriorated and crosstalk occurs, causing the degradation of display quality.

BRIEF SUMMARY

Accordingly, the present invention is directed to provide an LCD device and a driving method thereof that substantially obviate one or more problems due to limitations and disadvantages of the related art.

An aspect of the present invention is directed to provide an LCD device which can save the manufacturing cost that is expended by the application of four-color (RGBW) sub-pixels.

Another aspect of the present invention is directed to provide an LCD device, which enhances an aperture ratio and brightness when four-color (RGBW) sub-pixels are applied thereto, thus increasing display quality.

Another aspect of the present invention is directed to provide an LCD device in which four-color (RGBW) sub-pixels are formed without changing a manufacturing process design for the existing three-color (RGB) sub-pixels, thus saving the manufacturing cost.

Another aspect of the present invention is directed to provide an LCD device which controls polarities of image data (data voltages) that are respectively supplied to sub-pixels of the same color disposed on one horizontal line when four-color (RGBW) sub-pixels are applied thereto, thus preventing the deterioration of sub-pixels and reducing crosstalk.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device including: an upper substrate in which a plurality of red (R), green (G), blue (B) and white (W) color filters are formed; a lower substrate in which a plurality of R, G, B and W sub-pixels are formed in respective regions defined by intersection of a plurality of gate lines and data lines; and a liquid crystal layer formed between the upper substrate and the lower substrate, wherein, each of the pixels is configure with three-color sub-pixels of the R, G, B and W sub-pixels, and pixels of the plurality of pixels including a W sub-pixel share a one-color sub-pixel included in a pixel adjacent thereto, and display a color image.

The pixels including the W sub-pixel may share a one-color sub-pixel of the R, G and B sub-pixels with one or more pixels adjacent thereto, and display a color image with R, G, B and W sub-pixels, the one-color sub-pixel not being included in the pixels.

In the lower substrate, three-color (RGB) sub-pixels may be formed at a left and a right with respect to the W sub-pixel, and a pattern of seven sub-pixels including one W sub-pixel may be repeatedly formed.

In another aspect of the present invention, there is provided a driving method of an LCD device, in which a plurality of red (R), green (G), blue (B) and white (W) color filters are formed in respective regions defined by intersection of a plurality of gate lines and data lines, including: aligning input RGB video signals into digital image data; generating a scan signal to sequentially supply the scan signal to the R, G, B and W sub-pixels; converting the digital image data into RGBW image data; performing sub-pixel rendering on the RGBW image data; converting the rendered RGBW image data into analog image data; and supplying the analog image data to the R, G, B and W sub-pixels in synchronization with the scan signal to display a color image, wherein, each of the pixels is configure with three-color sub-pixels of the R, G, B and W sub-pixels, and pixels of the plurality of pixels including a W sub-pixel share a one-color sub-pixel included in a pixel adjacent thereto, and display a color image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an LCD device and a driving method thereof according to embodiments of the present invention will be described in detail with reference to the accompanying drawings.

Figure 1:
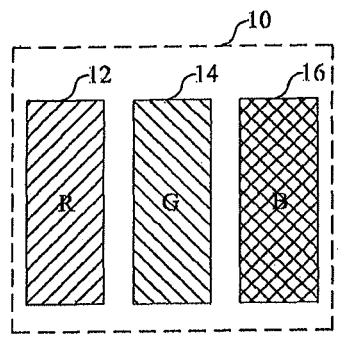
FIG. 1 is a diagram illustrating a pixel structure which includes RGB sub-pixels of a related art LCD device.
Figure 2:
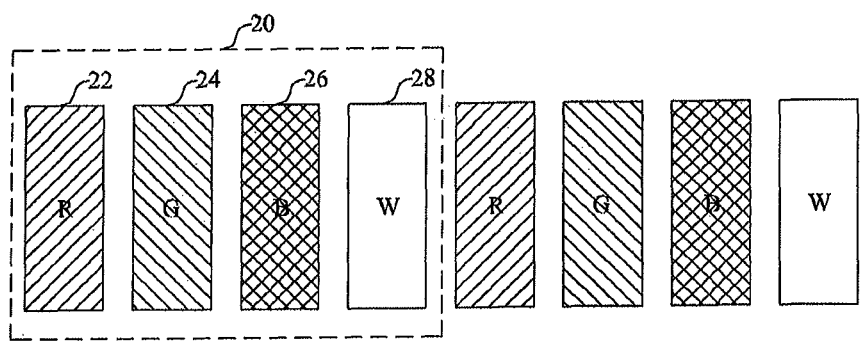
FIG. 2 is a diagram illustrating a pixel structure which includes RGBW sub-pixels of a related art LCD device.
Figure 3:
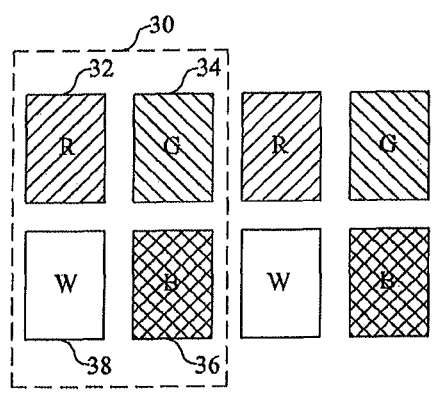
FIG. 3 is a diagram illustrating a quad pixel structure which includes RGBW sub-pixels of a related art LCD device.
Figure 4:
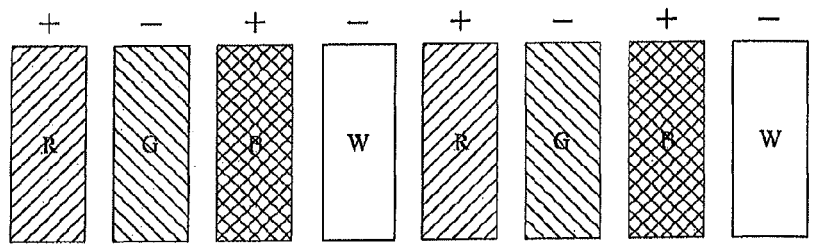
FIG. 4 is a diagram illustrating image data (data voltages) applied to a pixel structure which includes RGBW sub-pixels of a related art LCD device.
Figure 5:
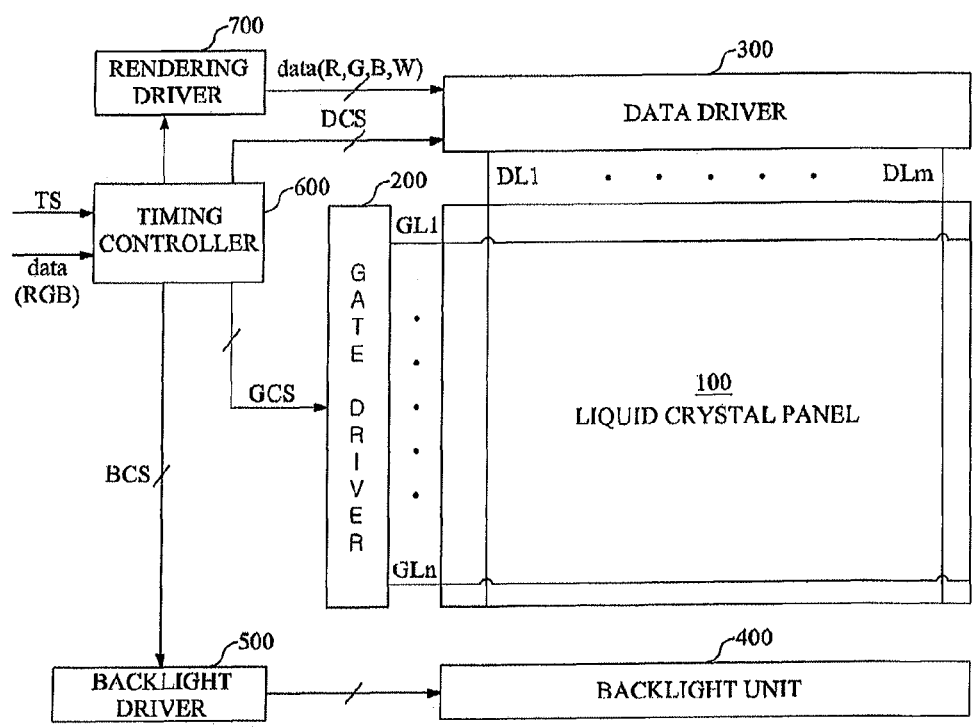
FIG. 5 is a diagram illustrating an LCD device according to an embodiment of the present invention.
Figure 6:
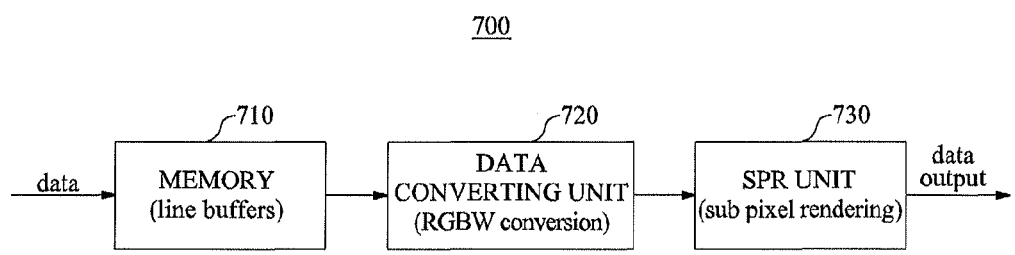
FIG. 6 is a diagram illustrating a rendering driver of FIG. 5.

FIG. 5 is a diagram illustrating an LCD device according to an embodiment of the present invention. FIG. 6 is a diagram illustrating a rendering driver of FIG. 5.

Referring to FIGS. 5 and 6, an LCD device according to an embodiment of the present invention includes a liquid crystal panel 100, a gate driver 200, a data driver 300, a backlight unit 400, a backlight driver 500, a timing controller 600, and a rendering driver 700.

The timing controller 600 converts input video signals (data) into digital image data R, G and B of a frame unit and supplies the digital image data RGB, aligned by frame unit, to the rendering driver 700 with an input timing signal TS. Herein, the timing signal TS includes a vertical sync signal Vsync, a horizontal sync signal Hsync and a clock signal CLK.

Moreover, the timing controller 600 generates a gate control signal GCS for controlling the gate driver 200 with the vertical sync signal Vsync, horizontal sync signal Hsync and clock signal CLK. Furthermore, the timing controller 600 generates a data control signal DCS for controlling the data driver 300. The timing controller 600 supplies the gate control signal GCS to the gate driver 200, and supplies the data control signal DCS to the data driver 300.

Herein, the data control signal DCS may include a source start pulse (SSP), a source sampling clock (SSC), a source output enable signal (SOE), and a polarity control signal (POL).

The gate control signal GCS may include a gate start pulse (GSP), a gate shift clock (GCS), and a gate output enable signal (GOE).

Furthermore, the timing controller 600 generates a backlight control signal BCS for controlling a backlight, on the basis of the input video data and timing signal TS. The timing controller 600 supplies the backlight control signal BCS to the backlight driver 500.

The rendering driver 700 of FIG. 6 converts the digital image data, inputted from the timing controller 600, into RGBW image data. The rendering driver 700 performs sub-pixel rendering on the RGBW image data and supplied the rendered image data to the data driver 300.

For this end, the rendering driver 700 includes a memory (line buffer) 710, a data converting unit 720, and a Sub-Pixel Rendering (SPR) unit (sub-pixel rendering means) 730.

The memory 710 stores the digital image data R, G and B, aligned by frame unit in the timing controller 600, by line unit. The memory 710 supplies the digital image data R, G and B, stored by line unit, to the data converting unit 720.

The data converting unit 720 converts image data such that the image data (data voltages), which are supplied to a plurality of pixels formed in the liquid crystal panel 100, are rendered to be suitable for a pixel structure. In this case, the image data may be converted in correspondence with each of the pixels. As an example, the data converting unit 720 may convert RGB type image data into the RGBW image data and supply the RGBW image data to the SPR unit 730.

The SPR unit 730 performs sub-pixel rendering on the RGBW image data supplied from the data converting unit 720, and supplies the rendered RGBW image data to the data driver 300/

Herein, the SPR unit 730 may perform sub-pixel rendering on the RGBW image data supplied from the data converting unit 720 as follows.

As an example, the SPR unit 730 may perform sub-pixel rendering on the RGBW image data, by horizontal line unit or vertical line unit.

As another example, the SPR unit 730 may perform sub-pixel rendering on the RGBW image data, by vertical and horizontal line unit.

As another example, the SPR unit 730 may perform sub-pixel rendering on the RGBW image data, by pixel block unit that is configured with a certain number of pixels or entire pixel unit that is driven during one frame.

In FIG. 5, the rendering driver 700 is illustrated and has been described above as an independent element in the LCD device according to an embodiment of the present invention. However, this is one embodiment of the present invention.

In another embodiment of the present invention, the rendering driver 700 may be included in the other element of the LCD device. As an example, the rendering driver 700 may be included in the timing controller 600.

The gate driver 200 generates a scan signal (gate driving signal) for driving a thin film transistor that is formed in each of the pixels, on the basis of the gate control signal GCS from the timing controller 600.

The scan signal generated by the gate driver 200 is sequentially supplied to a plurality of gate lines GL1 to GLn during one frame period. A thin film transistor formed in each sub-pixel is driven by the scan signal that is sequentially supplied to the gate lines GL1 to GLn, and thus, switching is performed in each pixel.

The data driver 300 includes a plurality of source drive ICs, each of which converts the image data (RGBW-rendered image data), supplied from the rendering driver 700, into analog image data, namely, data voltages.

The data driver 300 supplies data voltages for one horizontal line to a plurality of data lines DL1 to DLm at a time when a thin film transistor of each sub-pixel is turned on, on the basis of the data control signal DCS from the timing controller 600.

Herewith, a common voltage Vcom is supplied to a plurality of common electrodes that are respectively formed at the pixels. An electric field is generated in each pixel by a data voltage and common voltage supplied to each pixel. By aligning liquid crystal with the electric field that has been generated in each pixel, the light transmittance of each pixel may be controlled.

The liquid crystal panel 100 cannot self-emit light, and thus displays an image with light supplied from the backlight unit 400.

The backlight unit 400 irradiates light on the liquid crystal panel 100, and includes a plurality of backlights and optical members.

Herein, the backlights may be configured with a plurality of one type light sources or a plurality of two or more type light sources among Cold Cathode Fluorescent Lamps (CCFLs), External Electrode Fluorescent Lamps (EEFL), and Light Emitting Diodes (LEDs).

The optical members include a prism sheet, a diffuser sheet, a Dual Brightness Enhancement Film (DBEF), and a light guide panel (or diffusive plate).

The backlight driver 500 controls driving (on-off) of a plurality of backlights, and may control the on-off time, duty ratio and brightness of the backlights on the basis of a backlight control signal BCS supplied from the timing controller 600.

As an example, the backlight driver 500 may generate a driving signal (pulse width modulation signal (PWM) when the backlights are LEDs) for controlling brightness of the backlights, and control the duty ratio and brightness of the backlights with the driving signal.

The following description will be made with reference to FIG. 7 on a pixel structure of an LCD device according to an embodiment of the present invention that shares three-color sub-pixels of four-color (RGBW) sub-pixels and one sub-pixel of four-color (RGBW) sub-pixels included in an adjacent pixel to display a color image.

Figure 7:
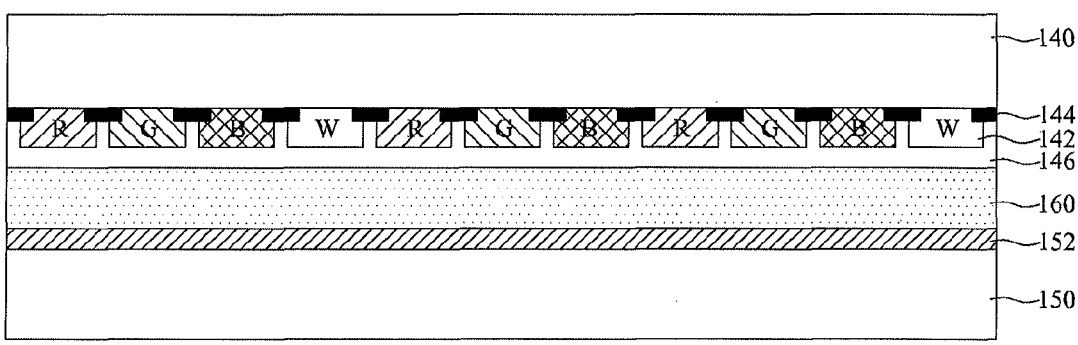
FIG. 7 is a diagram illustrating a liquid crystal panel of FIG. 5.
Figure 8:
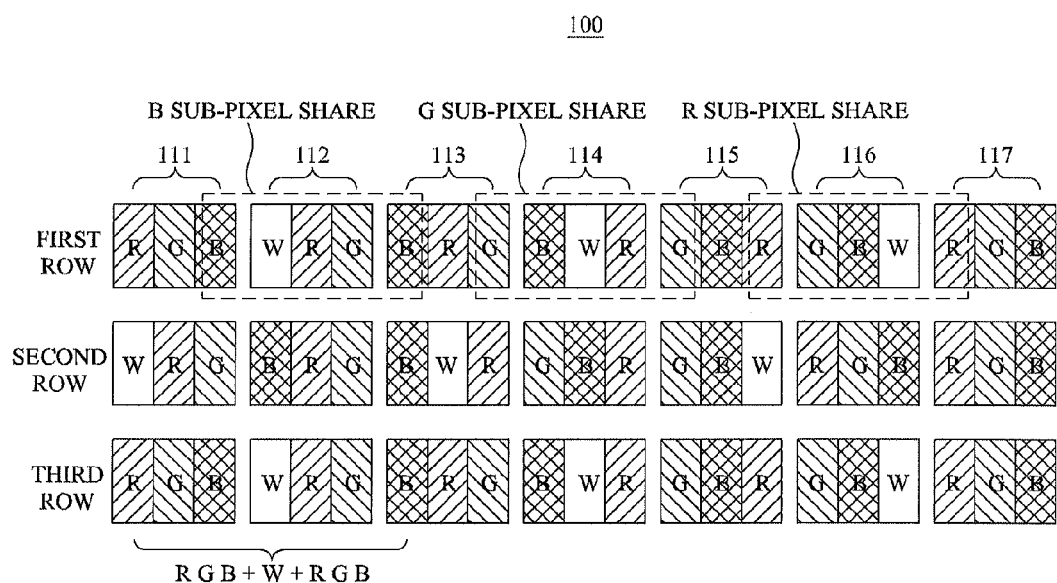
FIGS. 8 and 9 are diagrams illustrating a pixel structure and driving method of an LCD device according to a first embodiment of the present invention.
Figure 9:
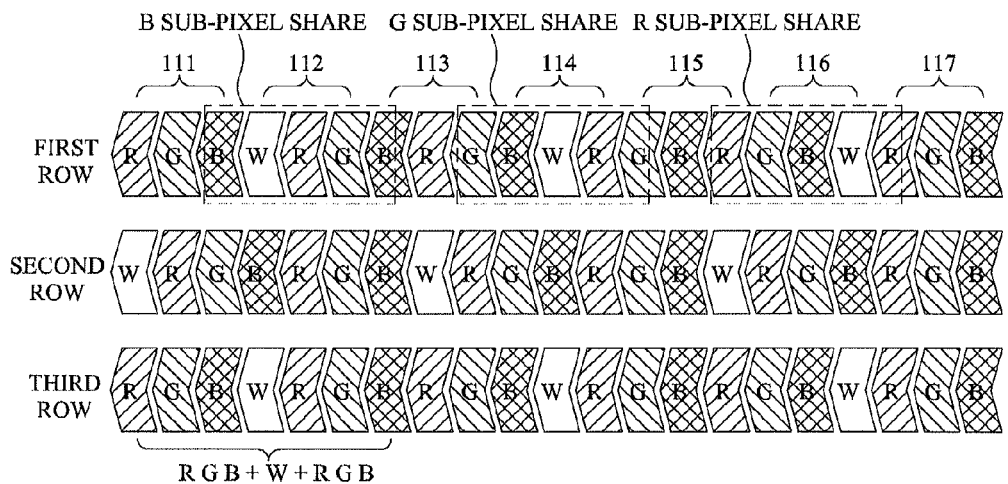

FIG. 7 is a diagram illustrating a liquid crystal panel of FIG. 5. FIGS. 8 and 9 are diagrams illustrating a pixel structure and driving method of an LCD device according to a first embodiment of the present invention. In FIG. 8, a sub-pixel is illustrated as having one domain. In FIG. 9, a sub-pixel is illustrated as having a multi-domain.

Referring to FIGS. 7 to 9, the liquid crystal panel 100 includes an upper substrate 140 and a lower substrate 150 that are coupled to each other with a liquid crystal layer 160 therebetween.

The gate lines GL1 to GLn and data lines DL1 to DLm are formed to intersect each other, at the lower substrate 150. A pixel array 152 is formed in a region that is defined by the intersection of the gate line and date line.

The pixel array 152 includes R, G, B and W sub-pixels, each of which includes a thin film transistor being a switching element, a storage capacitor Cst, a pixel electrode, and a common electrode.

Herein, the thin film transistor has a gate connected to a gate line, a source connected to a data line, and a drain connected to the pixel electrode.

When the liquid crystal panel 100 has an In-Plane Switching (IPS) mode, the common electrodes are formed at the lower substrate 150. When the liquid crystal panel 100 has a Vertical Alignment (VA) mode, the common electrodes may be formed at the upper substrate 140.

The upper substrate 140 includes a plurality of R, G, B and W color filters 142, a plurality of black matrixes 144, and an overcoat layer 146.

The black matrix 144 is formed between adjacent filters of the R, G, B and W color filters 142 to divide regions of respective sub-pixels, and prevents light interference between adjacent sub-pixels.

The overcoat layer 146 is formed on the color filters 142 and planarizes the upper substrate 140.

The liquid crystal panel 100 including the above-described elements aligns liquid crystal with an electric field that is generated by a data voltage (i.e., a pixel voltage) supplied to a sub-pixel and a common voltage Vcom supplied to a common electrode.

The transmittance of light from the backlight unit 400 is controlled by the alignment of liquid crystal. Light transmitted through the R, G, B and W color filters 142 is irradiated as inherent color light, thereby displaying a color image.

Herein, the color filters 142 formed at the upper substrate 140 are formed in correspondence with the respective sub-pixels formed at the lower substrate 150, and the liquid crystal panel 100 has a structure where a color filter pattern configured with seven color filters is repeatedly formed on a horizontal line and a vertical line.

Specifically, one color filter pattern is configured with seven color filters for respectively displaying R, G, B, W, R, G and B color light.

The liquid crystal panel 100 has a structure where R, G, B, W, R, G and B color filters are repeatedly formed as one group on a horizontal line and a vertical line.

That is, in the upper substrate 140, one color filter pattern is configured with seven color filters 142 (i.e., R, G, B, W, R, G and B color filters) and formed in a matrix type.

Herein, the W color filter may be formed in various types during a process of manufacturing the upper substrate 140.

As an example, the W color filter may be formed of a transparent resin. As another example, white light from the backlight unit 400 may be irradiated as-is without forming a separate resin in a white pixel region.

As illustrated in FIG. 8, four-color (RGBW) sub-pixels are repeatedly formed on a horizontal line and a vertical line, at the lower substrate 150. Herein, three-color (RGB) sub-pixels are formed at the left and the right with respect to the W sub-pixel. Therefore, seven sub-pixels including one W sub-pixel are repeatedly disposed at the lower substrate 150.

Specifically, seven color filters for respectively displaying R, G, B, W, R, G and B colors are repeatedly formed as one group on a horizontal line and a vertical line.

One pixel is configured with three sub-pixels among the R, G, B and W sub-pixels. For example, one pixel is configured with R, G and B sub-pixels or R, G and W sub-pixels or R, B and W sub-pixels or G, B and W sub-pixels. A pixel including a W sub-pixel does not include one of the R, G and B sub-pixels. In this case, the pixel including the W sub-pixel may share at least one sub-pixel of R, G and B sub-pixels adjacent thereto, when the pixel including the W sub-pixel displays an image.

Herein, pixels formed on an odd-numbered horizontal line and pixels formed on an even-numbered horizontal line may differ in arrangement type of sub-pixels configuring a pixel.

A first embodiment of the present invention will be described below with reference to FIGS. 8 and 9.

Among a plurality of pixels formed on one horizontal line, a first pixel 111, a third pixel 113, a fifth pixel 115, and a seventh pixel 117 may be configured with R, G and B sub-pixels. A second pixel 112, a fourth pixel 114, and a sixth pixel 116 may be configured with three sub-pixels that include a W sub-pixel and two of R, G and B sub-pixels.

In order to display a color image, each pixel is required to include three-color (RGB) sub-pixels.

Herein, the second pixel 112, fourth pixel 114, and sixth pixel 116 include a W sub-pixel, and thus do not include a specific sub-pixel (displaying one color) of R, G and B sub-pixels.

Therefore, to display a color image, the second pixel 112, fourth pixel 114, and sixth pixel 116 including a W sub-pixel share a one-color sub-pixel (not included therein) of three-color sub-pixels that are included in a pixel adjacent thereto.

In detail, the second pixel 112 configured with W, R, and G sub-pixels shares a B sub-pixel that is included in each of the first and third sub-pixels 111 and 113 adjacent thereto in a horizontal direction. Therefore, the second pixel 112 is configured with W, R, and G sub-pixels, but in driving, the second pixel 112 may share the B sub-pixels that are respectively included in the first and third sub-pixels 111 and 113 adjacent thereto, and thus display a color image with the R, G, B and W sub-pixels.

The fourth pixel 114 configured with B, W, and R sub-pixels shares a G sub-pixel that is included in each of the third and fifth sub-pixels 113 and 115 adjacent thereto in a horizontal direction. Therefore, the fourth pixel 114 is configured with B, W, and R sub-pixels, but in driving, the fourth pixel 114 may share the G sub-pixels that are respectively included in the third and fifth sub-pixels 113 and 115 adjacent thereto, and thus display a color image with the R, G, B and W sub-pixels.

The sixth pixel 116 configured with G, B, and W sub-pixels shares an R sub-pixel that is included in each of the fifth and seventh sub-pixels 115 and 117 adjacent thereto in a horizontal direction. Therefore, the sixth pixel 116 is configured with G, B and W sub-pixels, but in driving, the sixth pixel 116 may share the R sub-pixels that are respectively included in the fifth and seventh sub-pixels 115 and 117 adjacent thereto, and thus display a color image with the R, G, B and W sub-pixels.

As described above, in the LCD device according to the first embodiment of the present invention, one pixel is configured with three sub-pixels among R, G, B and W sub-pixels. Furthermore, pixels including a W sub-pixel may share one-color sub-pixel included in a pixel adjacent thereto, and thus display a color image.

Comparing the present invention with the related art where one pixel is configured with four (RGBW) sub-pixels, a measured result on white brightness is shown in Table (1) below.

TABLE 1

| | The related art (RGBW) | The present invention (RGBWRGB) | Remark |
|---|---|---|---|
| White brightness | 100% | 140% | Enhanced white brightness by 40% |

Referring to Table (1), when realizing a white image with only R, G and B sub-pixels other than a W sub-pixel, it can be seen that the present invention has further enhanced white brightness by about 40% than the related art where one pixel is configured with four (RGBW) sub-pixels. Comparing the present invention with the related art with respect to two pixels, it can be seen that the present invention has less decreased white brightness than the related art.

Specifically, when realizing a white image with only R, G and B sub-pixels without driving a W sub-pixel, the related art drives only six (RGBRGB) sub-pixels of eight sub-pixels without driving the other two W sub-pixels of the eight sub-pixels, and thus decreases brightness corresponding to the two W sub-pixels.

However, the present invention drives two pixels with seven sub-pixels R, G, B, W, R, G and B. When realizing a white image without driving a W sub-pixel, the present invention drives only six (RGBRGB) sub-pixels of the seven sub-pixels without driving the other one W sub-pixel of the seven sub-pixels, and thus only decreases brightness corresponding to the one W sub-pixel.

In the description of FIGS. 8 and 9, it has been described above that pixels formed on an odd-numbered horizontal line and pixels formed on an even-numbered horizontal line differ in arrangement type of sub-pixels. However, this is one embodiment of the present invention. Another embodiment of the present invention on an arrangement structure of sub-pixels configuring a pixel will be described below with reference to FIG. 10.

Figure 10:
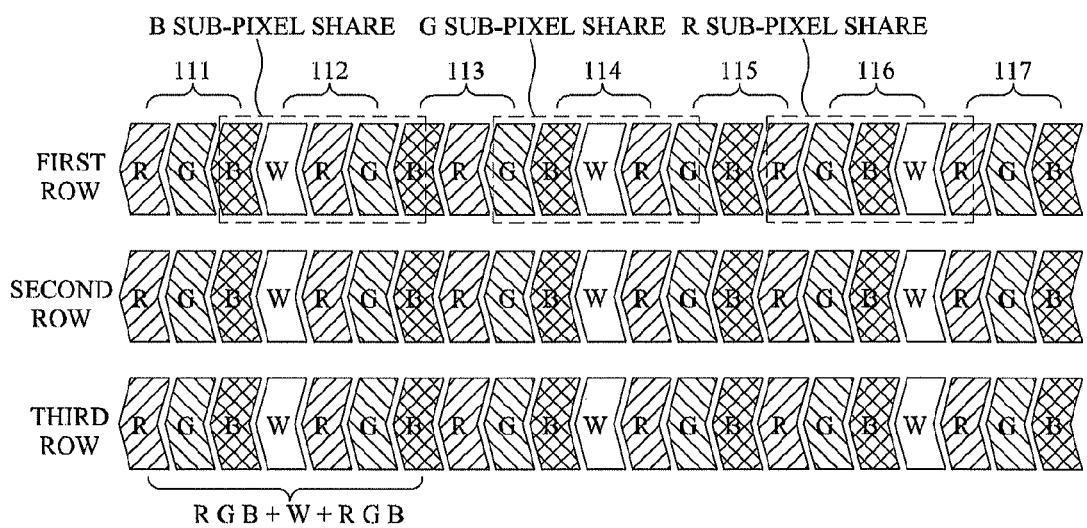
FIG. 10 is a diagram illustrating a pixel structure and driving method of an LCD device according to a second embodiment of the present invention.

FIG. 10 is a diagram illustrating a pixel structure and driving method of an LCD device according to a second embodiment of the present invention.

Referring to FIG. 10, in the LCD device according to the second embodiment, one pixel includes three (three-color) sub-pixels of four-color (RGBW) sub-pixels. A pixel including a W sub-pixel may share at least one sub-pixel of R, G and B sub-pixels included in pixels adjacent thereto, and thus display an image.

Herein, pixels formed on an odd-numbered horizontal line and pixels formed on an even-numbered horizontal line may be the same in arrangement type of sub-pixels.

Identically to the above-described first embodiment, in the LCD device according to the second embodiment, a second pixel 112, a fourth pixel 114, and a sixth pixel that include a W sub-pixel may share a one-color sub-pixel of R, G and B sub-pixels included in a pixel adjacent thereto, and thus display a color image.

In the description of FIGS. 8 and 9, it has been described above that a sub-pixel of one color which is not included in R, G and B colors shares a sub-pixel configuring a pixel adjacent thereto in a horizontal direction, for displaying a color image of a pixel including a W sub-pixel. However, this is one embodiment of the present invention.

Other embodiments of the present invention, in which pixels including a W sub-pixel shares a one-color sub-pixel included in pixels adjacent thereto, will be described below with reference to FIGS. 11 and 12.

Figure 11:
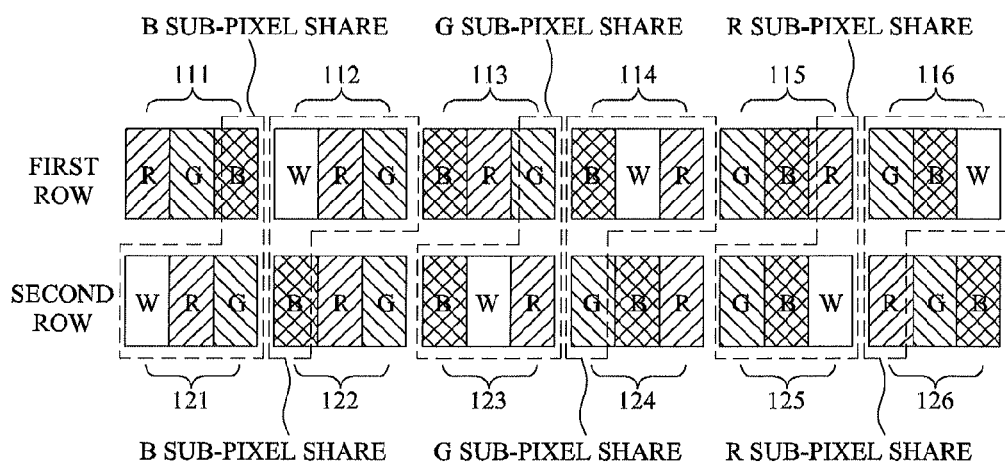
FIG. 11 is a diagram illustrating a pixel structure and driving method of an LCD device according to a third embodiment of the present invention.

FIG. 11 is a diagram illustrating a pixel structure and driving method of an LCD device according to a third embodiment of the present invention.

Referring to FIG. 11, in the LCD device according to the third embodiment of the present invention, each pixel may share a one-color sub-pixel (which is not included therein) of R, G and B sub-pixels configuring a pixel adjacent thereto in a vertical direction, in order for a pixel including a W sub-pixel to display a color image.

To provide a description on pixels formed in a first row, a second pixel 112, a fourth pixel 114, and a sixth pixel 116 that include a W sub-pixel may share a one-color sub-pixel included in a pixel adjacent thereto in a vertical direction, and thus display a color image.

As an example, the second pixel 112 configured with W, R, and G sub-pixels does not include a B sub-pixel. The second pixel 112 may share a B sub-pixel of an eighth pixel 122 that is formed in a second row to be adjacent thereto in a vertical direction, for displaying a color image.

The fourth pixel 114 configured with B, W, and R sub-pixels does not include a G sub-pixel. The fourth pixel 114 may share a G sub-pixel of an tenth pixel 124 that is formed in the second row to be adjacent thereto in a vertical direction, for displaying a color image.

The sixth pixel 116 configured with G, B, and W sub-pixels does not include an R sub-pixel. The sixth pixel 116 may share an R sub-pixel of a twelfth pixel 126 that is formed in the second row to be adjacent thereto in a vertical direction, for displaying a color image.

To provide a description on pixels formed in the second row, a seventh pixel 121, a ninth pixel 123, and an eleventh pixel 125 that include a W sub-pixel may share a one-color sub-pixel included in a pixel adjacent thereto in a vertical direction, and thus display a color image.

As an example, the seventh pixel 121 configured with W, R, and G sub-pixels does not include a B sub-pixel. The seventh pixel 121 may share a B sub-pixel of the first pixel 111 that is formed in the first row to be adjacent thereto in a vertical direction, for displaying a color image.

The ninth pixel 123 configured with B, W, and R sub-pixels does not include a G sub-pixel. The ninth pixel 123 may share a G sub-pixel of the third pixel 113 that is formed in the first row to be adjacent thereto in a vertical direction, for displaying a color image.

The eleventh pixel 125 configured with G, B, and W sub-pixels does not include an R sub-pixel. The eleventh pixel 125 may share an R sub-pixel of the fifth pixel 115 that is formed in the first row to be adjacent thereto in a vertical direction, for displaying a color image.

Figure 12:
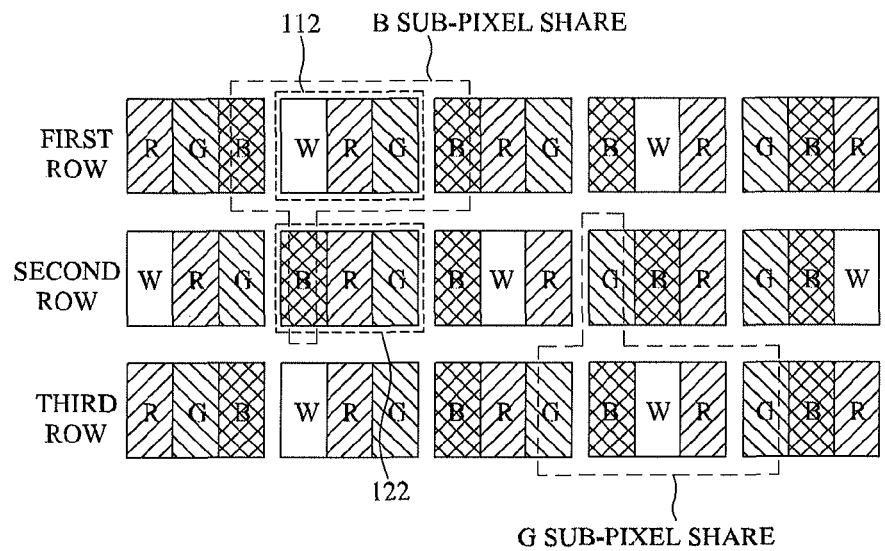
FIG. 12 is a diagram illustrating a pixel structure and driving method of an LCD device according to a fourth embodiment of the present invention.

FIG. 12 is a diagram illustrating a pixel structure and driving method of an LCD device according to a fourth embodiment of the present invention. In FIG. 12, among a plurality of pixels including a W sub-pixel, a pixel formed in a first row is illustrated as an example. A pixel including a W sub-pixel is illustrated as sharing a one-color sub-pixel included in a pixel adjacent thereto.

Referring to FIG. 12, in the LCD device according to the fourth embodiment of the present invention, each pixel may share a one-color sub-pixel (which is not included therein) of R, G and B sub-pixels configuring a pixel adjacent thereto in a vertical direction and a horizontal direction, in order for a pixel including a W sub-pixel to display a color image.

For example, a second pixel 112 that includes W, R, and G sub-pixels but does not include a B sub-pixel may share a B sub-pixel included in the first and third pixels 111 and 113 adjacent thereto in a horizontal direction, for displaying a color image. Furthermore, the second pixel 112 may share the B sub-pixel of the eighth pixel 122 that is formed in a second row to be adjacent thereto in a vertical direction.

As described above, although the second pixel 112 including no B sub-pixel is configured with only W, R, and G sub-pixels, the second pixel 112 may share a B sub-pixel that is included in pixels adjacent thereto in a horizontal direction and a vertical direction, and thus display a color image with R, G, B and W sub-pixels.

In the LCD device having the above-described configuration and pixel structure, according to embodiments of the present invention, when applying a four-color (RGBW) sub-pixel structure including a W sub-pixel for enhancing brightness, a pixel design and a mask for forming a pixel structure configured with three-color (RGB) sub-pixels may be used as-is, thus saving the manufacturing cost that is expended by applying the four-color (RGBW) sub-pixel structure.

In the LCD device according to embodiments of the present invention, one W sub-pixel is formed per unit of seven sub-pixels (R, G, B, W, R, G and B), thereby displaying a color image with three-color (RGB) sub-pixels. By enhancing brightness of a pixel with a W sub-pixel, the display quality of an image can increase. That is, by repeatedly forming a pattern of seven sub-pixels including a W sub-pixel, the brightness and color purity of a pixel can increase.

Moreover, in the LCD device according to embodiments of the present invention, one pixel is configured with three sub-pixels, and thus, an aperture ratio of a pixel can more increase than the four-color (RGBW) sub-pixel structure of the related art, thereby increasing the display quality of an image.

Figure 13:
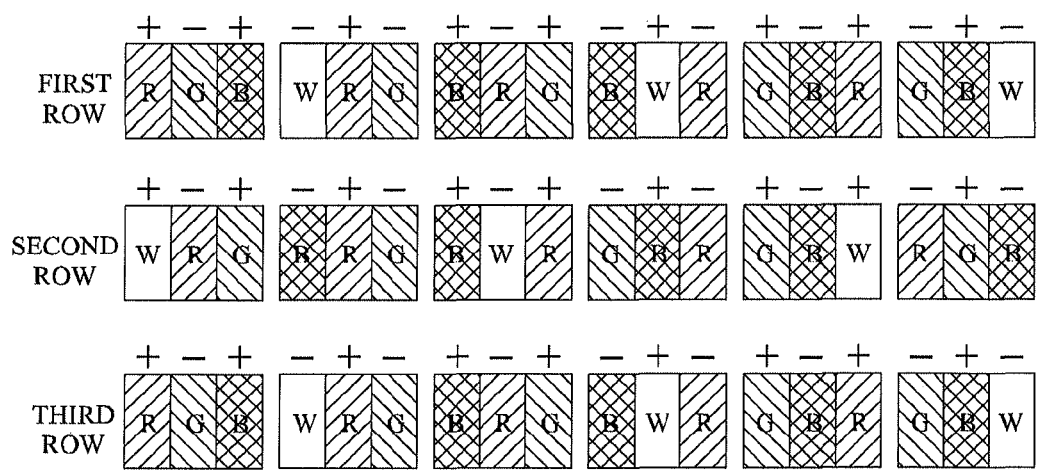
FIGS. 13 to 15 are diagrams illustrating respective image data (data voltages) applied to pixels of an LCD device according to an embodiment of the present invention.
Figure 14:
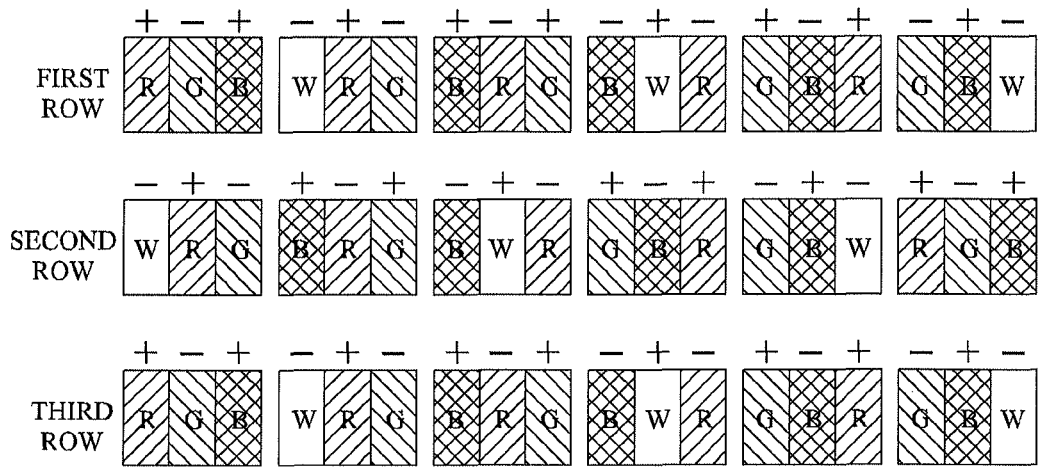
Figure 15:
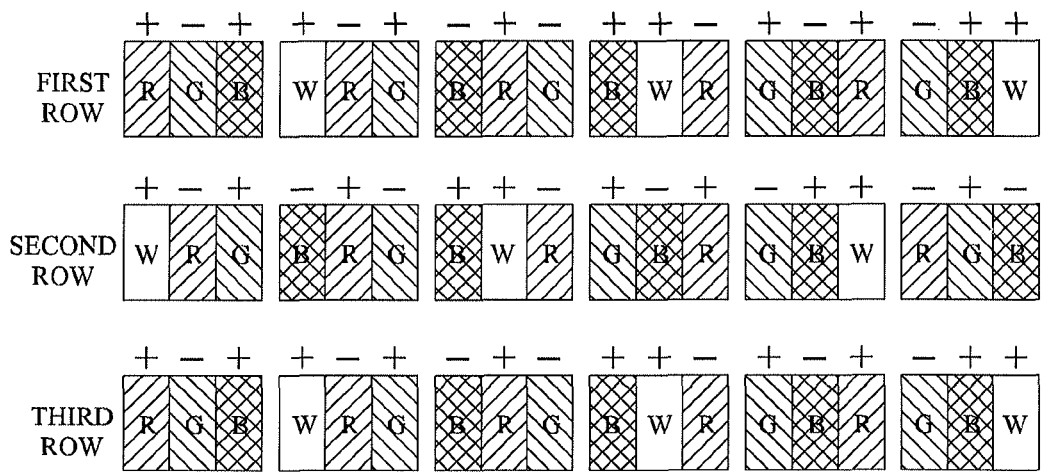

FIGS. 13 to 15 are diagrams illustrating respective image data (data voltages) applied to pixels of an LCD device according to an embodiment of the present invention.

Referring to FIG. 13, as an example of supplying image data to pixels, the LCD device according to an embodiment of the present invention may apply a 1-dot inversion scheme per one horizontal line to supply the image data to sub-pixels.

Therefore, by alternately changing polarities of image data that are supplied to the sub-pixels disposed on one horizontal line, the present invention can prevent the deterioration of sub-pixels and the generation of crosstalk.

Referring to FIG. 14, as another example of supplying image data to pixels, the LCD device according to an embodiment of the present invention may apply the 1-dot inversion scheme for a vertical line and a horizontal line to supply the image data to total sub-pixels.

Therefore, by alternately changing polarities of image data supplied to sub-pixels that are adjacently formed on a vertical line and a horizontal line, the present invention can prevent the deterioration of sub-pixels and the generation of crosstalk.

Referring to FIG. 15, as another example of supplying image data to pixels, the LCD device according to an embodiment of the present invention may apply the 1-dot inversion scheme to the R, G and B sub-pixels to supply the image data to the R, G and B sub-pixels. The image data are respectively supplied to the R, G and B sub-pixels to alternately change polarities of the image data which are supplied to sub-pixels of the same color disposed on one horizontal line or sub-pixels of the same color disposed on one vertical line. In this case, the LCD device according to an embodiment of the present invention may supply image data having the same polarity to W sub-pixels among total R, G, B and W sub-pixels.

Therefore, by alternately changing polarities of image data supplied to R, G and B sub-pixels that are adjacently formed on a vertical line or a horizontal line, the present invention can prevent the deterioration of sub-pixels and the generation of crosstalk. Meanwhile, the image data are respectively supplied to the R, G and B sub-pixels to alternately change polarities of the image data which are supplied to sub-pixels of the same color disposed on one horizontal line and sub-pixels of the same color disposed on one vertical line. That is, the image date are respectively supplied to the R, G and B sub-pixels to alternately change polarities of the image data which are supplied to total sub-pixels driven during one frame period. Therefore, by alternately changing polarities of image data supplied to R, G and B sub-pixels that are adjacently formed on a vertical line and a horizontal line, the present invention can prevent the deterioration of sub-pixels and the generation of crosstalk.

Herein, the polarities of image data supplied to all the sub-pixels of FIGS. 13 to 15 may be changed by a frame inversion scheme.

By using the pixel structures of FIGS. 13 to 15 and the methods of supplying image data that have been described above with reference to FIGS. 13 to 15, the present invention can prevent the deterioration of sub-pixels and the generation of crosstalk, thus increasing the display quality of an image.

In the LCD device according to embodiments of the present invention, a pixel structure is formed such that a pixel including a W sub-pixel shares a one-color sub-pixel which is included in a pixel adjacent thereto in a horizontal direction, a vertical direction, or a horizontal direction and vertical direction, and by rendering image data of R, G, B and W sub-pixels, the brightness and color purity of a displayed image can increase, thus enhancing display quality.

According to the embodiments, the present invention can save the manufacturing cost that is expended by the application of the four-color (RGBW) sub-pixels.

According to the embodiments, the present invention enhances an aperture ratio and brightness when the four-color (RGBW) sub-pixels are applied thereto, and thus increase display quality.

According to the embodiments, the present invention forms the four-color (RGBW) sub-pixels and the four-color color filters without changing a manufacturing process design for the existing three-color (RGB) sub-pixels, and can save the manufacturing cost of the LCD device.

According to the embodiments, the present invention controls polarities of image data (data voltages) that are respectively supplied to the sub-pixels disposed on one horizontal line when the four-color (RGBW) sub-pixels are applied thereto, and thus can prevent the deterioration of the sub-pixels and reduce crosstalk.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A Liquid Crystal Display (LCD) device comprising:
an upper substrate in which a plurality of red (R), green (G), blue (B) and white (W) color filters are formed;
a lower substrate in which a plurality of R, G, B and W sub-pixels are formed in respective regions defined by intersection of a plurality of gate lines and data lines; and
a liquid crystal layer formed between the upper substrate and the lower substrate,
wherein pixels comprise a first pixel having R, G and B sub-pixels, a second pixel having R, G and W sub-pixels, a third pixel having R, B and W sub-pixels and fourth pixel having G, B and W sub-pixels, and
wherein the second pixel shares a B sub-pixel in a pixel adjacent thereto in a vertical direction and a horizontal direction, the third pixel shares a G sub-pixel in a pixel adjacent thereto in a vertical direction and a horizontal direction, the fourth pixel shares an R sub-pixel in a pixel adjacent thereto in a vertical direction and a horizontal direction, and a pixel comprising a W sub-pixel is disposed between two pixels which each comprise the R, G, and B sub-pixels.

2. The LCD device of claim 1, wherein the pixels comprising the W sub-pixel share a one-color sub-pixel of the R, G and B sub-pixels with one or more pixels adjacent thereto, and display a color image with R, G, B and W sub-pixels, the one-color sub-pixel not being comprised in the pixels.

3. The LCD device of claim 1, wherein the pixels comprising the W sub-pixel share a one-color sub-pixel which is comprised in one or more pixels adjacent thereto in a horizontal direction, and display a color image with R, G, B and W sub-pixels.

4. The LCD device of claim 1, wherein the pixels comprising the W sub-pixel share a one-color sub-pixel which is comprised in one or more pixels adjacent thereto in a vertical direction, and display a color image with R, G, B and W sub-pixels.

5. The LCD device of claim 1, wherein the pixels comprising the W sub-pixel share a one-color sub-pixel which is comprised in pixels adjacent thereto in a horizontal direction and a vertical direction, and display a color image with R, G, B and W sub-pixels.

6. The LCD device of claim 1, wherein a color filter pattern is repeatedly formed at the upper substrate, the color filter pattern being configured with R, G, B, W, R, G and B color filters.

7. The LCD device of claim 1, wherein, in the lower substrate,
three-color (RGB) sub-pixels are formed at a left and a right with respect to the W sub-pixel, and
a pattern of seven sub-pixels comprising one W sub-pixel is repeatedly formed.

8. The LCD device of claim 1, further comprising:
a timing controller aligning input RGB video signals into digital image data;
a gate driver generating a scan signal to supply the scan signal to the R, G, B and W sub-pixels;
a rendering driver converting the digital image data into RGBW image data, and performing sub-pixel rendering on the RGBW image data;
a data driver converting the rendered RGBW image data into analog image data to supply the analog image data to the R, G, B and W sub-pixels; and
a backlight unit supplying light to the R, G, B and W sub-pixels.

9. The LCD device of claim 8, wherein image data are respectively supplied to the R, G and B sub-pixels to alternately change polarities of the image data which are supplied to total sub-pixels driven during one frame period, sub-pixels of the same color disposed on one horizontal line, or sub-pixels of the same color disposed on one vertical line.

10. A driving method of a Liquid Crystal Display (LCD) device, in which a plurality of red (R), green (G), blue (B) and white (W) color filters are formed in respective regions defined by intersection of a plurality of gate lines and data lines, the driving method comprising:
aligning input RGB video signals into digital image data;
generating a scan signal to sequentially supply the scan signal to the R, G, B and W sub-pixels;
converting the digital image data into RGBW image data;
performing sub-pixel rendering on the RGBW image data;
converting the rendered RGBW image data into analog image data; and
supplying the analog image data to the R, G, B and W sub-pixels in synchronization with the scan signal to display a color image,
wherein pixels comprise a first pixel having R, G and B sub-pixels, a second pixel having R, G and W sub-pixels, a third pixel having R, B and W sub-pixels and fourth pixel having G, B and W sub-pixels, and
wherein the second pixel shares a B sub-pixel in a pixel adjacent thereto in a vertical direction and a horizontal direction the third pixel shares a G sub-pixel in a pixel adjacent thereto in a vertical direction and a horizontal direction, the fourth pixel shares an R sub-pixel in a pixel adjacent thereto in a vertical direction and a horizontal direction, and a pixel comprising a W sub-pixel is disposed between two pixels which each comprise the R, G, and B sub-pixels.

11. The driving method of claim 10, wherein the pixels comprising the W sub-pixel share a one-color sub-pixel of the R, G and B sub-pixels with one or more pixels adjacent thereto, and display a color image with R, G, B and W sub-pixels, the one-color sub-pixel not being comprised in the pixels.

12. The driving method of claim 10, wherein the pixels comprising the W sub-pixel share a one-color sub-pixel which is comprised in one or more pixels adjacent thereto in a horizontal direction, and display a color image with R, G, B and W sub-pixels.

13. The driving method of claim 10, wherein the pixels comprising the W sub-pixel share a one-color sub-pixel which is comprised in one or more pixels adjacent thereto in a vertical direction, and display a color image with R, G, B and W sub-pixels.

14. The driving method of claim 10, wherein the pixels comprising the W sub-pixel share a one-color sub-pixel which is comprised in pixels adjacent thereto in a horizontal direction and a vertical direction, and display a color image with R, G, B and W sub-pixels.

15. The driving method of claim 10, wherein image data are respectively supplied to the R, G and B sub-pixels to alternately change polarities of the image data which are supplied to total sub-pixels driven during one frame period, sub-pixels of the same color disposed on one horizontal line, or sub-pixels of the same color disposed on one vertical line.

* * * * *